UNITED STATES PATENT OFFICE.

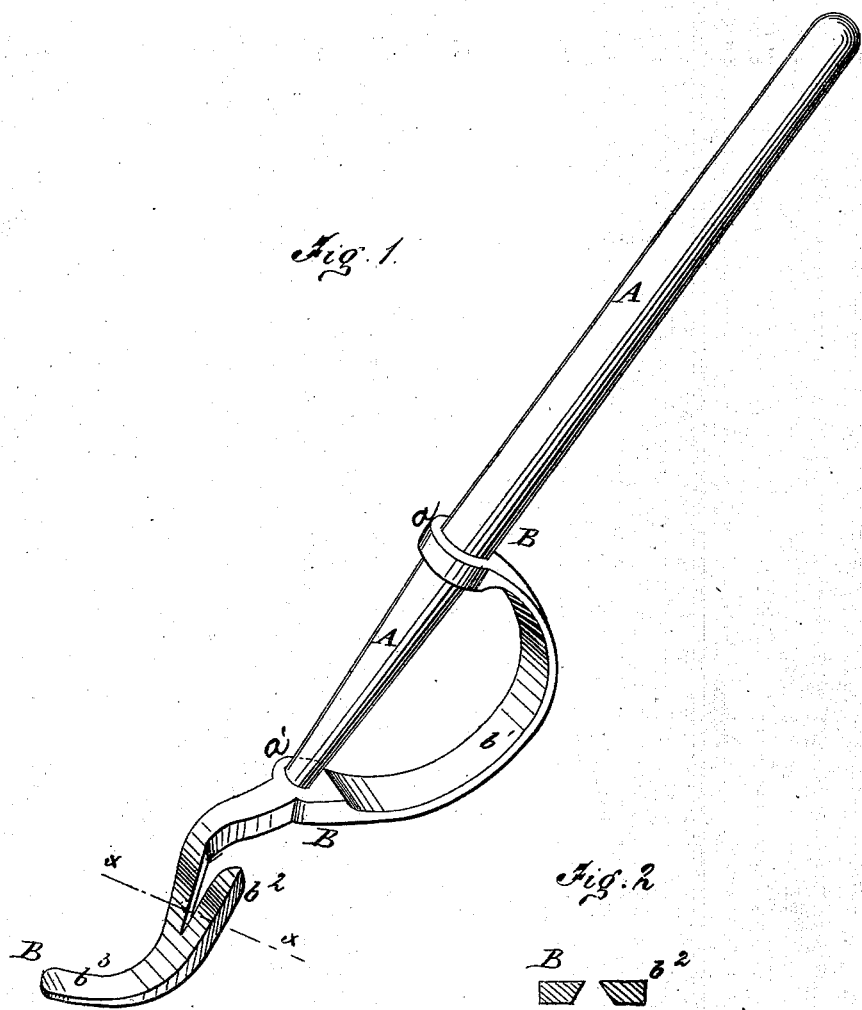

CADWALLADER HEACOCK, OF TRINITY, TEXAS.

IMPROVEMENT IN STALK-PULLERS.

Specification forming part of Letters Patent No. 146,825, dated January 27, 1874; application filed October 18, 1873.

*To all whom it may concern:*

Be it known that I, CADWALLADER HEACOCK, of Trinity, in the county of Trinity and State of Texas, have invented a new and useful Improvement in Cotton-Stalk Puller, of which the following is a specification:

Figure 1 is a perspective view of my improved cotton-stalk puller. Fig. 2 is a cross-section taken through the line $x\,x$, Fig. 1.

Similar letters of reference indicate corresponding parts.

The invention will first be fully described, and then pointed out in the claim.

A is the wooden handle of the instrument, which is made of such a length and size as to be convenient in use, and which is inserted in eyes $a\,a'$ in the upper end and middle part of the metallic bar B. The upper part of the bar B, between the eyes for the handle A, has a curve or arch, $b^1$, formed in it, as shown in Fig. 1, to serve as a fulcrum in using the instrument. The part of the bar B in front of the end of the handle A projects upward, and is bent forward so as to be nearly parallel with the handle, and has a fluke, $b^2$, formed upon its side, and projecting to the rearward at an acute angle with the bottom of the bar B. The adjacent edges of the fluke $b^2$ and body of the bar B are beveled upon the lower side, as shown in Fig. 2, to cause said edges to take a firmer hold upon the stalk to be pulled. The end $b^3$ of the bar B projects forward, and is curved upward to form a hook or prong to adapt the instrument for use for throwing the pulled stalks together into windrows for convenience in burning or drawing them off.

In using the instrument, the fluke $b^2$ is passed around the stalk near the ground, and the instrument is drawn back to bring the said stalk as far as possible into the angle. The bow or bend $b^1$, sliding upon the ground, enables this to be done easily. The handle A is then pressed downward, and, the bow or bend $b^1$ serving as a fulcrum, the stalk is drawn from the ground.

Having thus described my invention, I claim as new and desire to secure by Letters Patent—

The combination, in a stalk-puller, of the handle-sockets $a\,a'$, curved fulcrum $b^1$, projecting curved end or prong $b^3$, and side fluke $b^2$, substantially as shown and described.

CADWALLADER HEACOCK.

Witnesses:
B. F. HARPER,
J. T. MANEY,
A. F. WILSON.